Patented Apr. 13, 1943

2,316,458

UNITED STATES PATENT OFFICE 2,316,458

METHOD OF PREPARING SOYBEANS

Oreste Scalise, New York, N. Y.

No Drawing. Application July 12, 1940,
Serial No. 345,115

17 Claims. (Cl. 99—98)

The present invention relates to a method of manufacturing soya beans into a nut-like product.

Although the soya bean has been an article of diet for centuries in China, it has only been recently that much interest has been exhibited in its value as a food confection in occidental countries. As a result of this interest, many large manufacturers of confections have attempted to use soya beans in their products. As processed in these industries, the bean is simply peeled and fried in hot oil and the like. The resulting product is a shriveled, dense, hard, greasy article. In addition, the oil, which is probably that which is used in frying, oozes and sweats from the beans with the result that the bean greases everything with which it comes in contact. Such an excess of oil on the surface of the beans presents difficulties in manufacturing, handling, merchandizing and consuming. These and other difficulties have mitigated against the use of this nutritive food and no one, so far as I am aware has overcome these shortcomings.

It is well known that the prior art processes involved soaking the beans in water, in salt solutions, in alkaline solutions and in other solutions for various purposes and for relatively short periods of time. After the beans had been so treated, they were fried in oils, such as cottonseed, peanut and coconut oil, having a liquid character and being fluid at normal room temperatures and above.

In the past, soya beans, as other legumes, have been soaked in salt solutions of various concentrations. Nuts likewise have been soaked in solutions containing flavoring and coloring matter, such as vanilla, which not only flavored but also colored the product. As those skilled in the art know, concentrations of salt employed in soaking legumes have been determined by taste. The quantity of salt employed in the soaking liquor has been dependent upon the taste of the finished product and upon the use, for example, as a staple article of everyday consumption, as a confection or as a pastry. For example, it is old in the art to soak pistachio nuts in saturated salt solution as is clearly described in Zaloom's U. S. Patent No. 1,460,510, and Reissue Patent No. 15,902. Beeton, in his Book of Household Management (published in 1869 by Ward, Lock and Tyler of London), teaches to add salt to the water used to soak legumes. Thus, on pages 736 et seq. Beeton teaches to boil broad or Windsor beans in ½ gallon of water containing 1 heaped tablespoonful of salt. In other words, about ½ ounce or about 15 grams of salt in 2 quarts or 1.9 liters of water. This is equivalent to about 0.8% salt solution. On the other hand, Beeton also teaches that to prepare a quart of French beans, 3 ounces of fresh butter and pepper and salt to taste and the juice of ½ lemon are used. It is also known in the art that soya beans are prepared in accordance with recipes found suitable for other beans. Thus Bowdidge, "The Soya Bean," page 81, makes the following statement:

"* * * and the dried beans, if soaked for 48 hours, may be cooked like harriot or butter beans * * *."

Furthermore, British Patent No. 143,804 of June 3, 1920, teaches to use salt solutions containing 0.6% salt. Again in Zeitschrift fur Untersuchung der Libersmittel, volume 64, page 541 (1932), Kaltschews states that after carefully washing the beans, the beans are soaked for 30 hours at room temperature in a solution containing 5% of salt or 5% of soda or 5% of each.

In addition, Horwath, the acknowledged authority on the soya bean, in his book, "The Soya Bean as Human Food," page 31, says, "In China, the green seeded variety of soya beans is soaked in fresh water or salt water * * *." Soya beans have also been cooked in saturated salt solutions. (Horwath loc. cit.). Moreover, in U. S. Patent No. 1,585,128, Smith teaches to use brine (salt solution) of any suitable strength. It is manifest that various concentrations of salt have been used in preparing soya beans or, in other words, the amount of salt employed in preparing soya beans is dependent upon the taste as in the preparation of most foodstuffs.

I have discovered a method of manufacturing soya beans for human consumption in cakes, cookies, candies and the like which eliminates all of the disadvantages and shortcomings of the conventional product.

It is an object of the invention to produce improved, processed non-greasy soya beans.

It is another object of the invention to produce processed soya beans swollen to a volume several times their original size.

It is a further object of the invention to produce light, fluffy soya beans which are friable and easily chewed.

The invention also contemplates a process of producing processed soya beans having an acquired flavor and/or added salt.

Other objects and advantages will become apparent from the following description.

Broadly stated, my invention provides for the manufacture of soya beans in such a manner that the beans swell to many times their original size. As a result the beans are not hard and dense, but are light and fluffy and are easily disintegrated by the teeth. In addition, the bean no longer oozes or sweats oil after being fried and has combined with the pleasant nutty flavor an additional flavor which may be varied within certain limits by the processor.

For the purpose of giving those skilled in the art a better understanding of my invention, the following description will be given of a preferred procedure of carrying it into practice.

The edible soya beans of commerce are soaked for a period of time, say 24 hours, in water preferably at room temperature. The beans may be decorticated before or after steeping by a blanching machine. It is preferred to add a flavoring, such as vanilla, nut flavor, etc., and/or salt to the steep water. After the beans have swelled to a considerable extent, they are removed from the steep water and are drained. If desired, the wet beans can be blotted with cloth or paper to remove more moisture. After the removal of the desired moisture the beans are fried or dehydrated. As a medium for frying or dehydrating, I use a solid material, to wit: a high melting point fat, such as cocoa butter or hydrogenated cocoanut oil or hydrogenated cottonseed oil melting above about 20–30° C. and preferably about 38 to about 42° C. The beans are allowed to remain in the frying medium until they have become brown or yellow or other desired variation of the color. The fried soya beans are then removed from the frying medium, are drained and are stored or packaged for the trade.

In frying or roasting or dehydrating nuts and legumes, it has been customary to carry out this step of the process at temperatures in the neighborhood of about 400° F. Thus, in U. S. Patent No. 2,019,141, granted in October 29, 1935, Knowles states at page 2, right column, lines 10 to 14:

"It is known that temperatures in the neighborhood of 375 degrees F. to 400 degrees F. have been employed for quickly cooking soya beans the like to impart thereto brittle and 'roasted-nut' like properties."

Sloat in U. S. Patent No. 1,774,110 teaches to use temperatures of about 190° C. to about 200° C. or thereabouts, that is to say, temperatures of about 374° F. to 392° F. I have found that temperatures of the order used by the prior art as given by Knowles give satisfactory results. In other words, I have employed temperatures of 398° F., 400° F., 401° F., 403° F., 405° F., and 410° F. with equally satisfactory results. As those skilled in the art know, when beans are first introduced into the hot frying medium, the temperature of the medium drops considerably. I thereupon raise the temperature of the oil until the beans are sufficiently dehydrated as indicated by the color change to a dark yellow or light brown. Beans when fried until they have acquired a yellow or light brown color have a residual moisture content of about 2% or about 3%. It is preferred to employ dehydrogenated oil which is a solid material at ordinary or room temperatures, such as hydrogenated coconut oil or hydrogenated cottonseed oil having a melting point of at least 119° F. The beans may be fried or dehydrated before or after dehulling, but, as those skilled in the art know, it is easier to dehull the beans after frying just as peanuts are dehulled after roasting. However, I have found that the residual moisture of the beans is the same whether the beans are dehydrated before or after decorticating. Thus, beans which had been fried before decortication to a light brown or yellow color had a residual moisture content of 2.01%, and beans which had been decorticated and then dehydrated had a residual moisture content of 1.98% when fried to a light brown or yellow color as mentioned hereinabove.

In accordance with the foregoing description, my invention was carried into practice using various soya beans. For example, one variety of soya beans when soaked in an 8% salt solution for 24 hours swells to a little more than twice the normal size. That is to say, the beans absorb about 118 to 126% by weight of the salt solution. On the other hand, beans of another variety when soaked for 24 hours in 10% salt solution swell to a little less than twice the normal size. In other words, the beans of the second variety absorb about 94% by weight of salt solution. Beans of the second variety when soaked in a 5% salt solution absorbed about 99% by weight of salt solution. However, these beans, when soaked in water containing no salt or only traces thereof for about 24 hours swelled to about 3 times the original size or absorbed about 205% by weight of water. The Illini variety of soya beans likewise swells to about the same extent.

It is also of interest to note that the degree to which the bean swells does not seem to be affected by the removal of the hull. Thus, beans in the unhulled condition, when soaked in 4% sodium chloride absorbed about 116% brine by weight. In the same period and in the same concentration of salt, hulled beans absorbed about 126% brine by weight.

Although the soya beans absorb about 100% or more of the steeping medium, at the end of 16 hours or more, nevertheless the density of the beans is reduced appreciably. Thus, I have determined the density of unsoaked soya beans of 3 representative varieties, to wit: Rockusun, Haberlandt, and Illini, and found that the densities of these beans are as follows: Rockusun, 1.231; Haberlandt, 1.234; and Illini, 1.195 referred to distilled water at 25° C. The density of the soaked beans of each of these varieties was determined in the following manner: 100 beans of each variety were soaked in various steeping media until the beans had soaked up sufficient of the steeping media to increase their volume of approximately twice the original volume. The beans were then removed from the steeping media, given a quick rinse and the superficial moisture dried off by rolling them in towels. 5 steeping media were employed, to wit: (a) plain tap water; (b) water containing 5% salt [sodium chloride]; (c) water containing 10% salt; (d) water containing 20% salt; and (e) tap water containing one teaspoonful of vanilla extract to 3 ounces of water. The densities of each of the three varieties of beans, to wit: Rockusun, Haberlandt and Illini, after soaking for the indicated period of time in the indicated solution, is as follows:

| Steeping medium | Time of steeping | Density of soaked beans | | |
|---|---|---|---|---|
| | | Rock-usun | Haber-landt | Illini |
| | Hours | Per cent | Per cent | Per cent |
| Water | 24 | 1.081 | 1.089 | 1.084 |
| Salt soln.: | | | | |
| 5____per cent | 28 | 1.100 | 1.106 | 1.110 |
| 10_____do | 30 | 1.148 | 1.128 | 1.127 |
| 20_____do | 48 | 1.179 | 1.162 | 1.146 |
| Vanilla extract | 16 | 1.077 | 1.077 | 1.078 |

The amount of steeping liquor absorbed by the beans was measured by subtracting the original dry weight of 100 beans from the weight of 100 beans after steeping, subsequent to removing the superficial steeping medium. In terms of the weight of the original beans, the amount of steeping medium absorbed is given in percentages in the following tabulation:

| Steeping medium | Time of steeping | Density of soaked beans | | |
|---|---|---|---|---|
| | | Rock-usun | Haber-landt | Illini |
| | Hours | Per cent | Per cent | Per cent |
| Water | 24 | 133.5 | 141.8 | 129.0 |
| Salt soln.: | | | | |
| 5____per cent | 28 | 101.0 | 104.7 | 112.6 |
| 10_____do | 30 | 84.9 | 81.5 | 92.9 |
| 20_____do | 48 | 102.3 | 99.1 | 116.0 |
| Vanilla extract | 16 | 126.9 | 129.0 | 123.2 |

From the foregoing tabulations it will be readily appreciated that all the beans swell to approximately twice the original size in accordance with the principles of the present invention. As those skilled in the art appreciate, the rates vary according to the variety of the bean and also to the steeping medium.

When preparing the soya beans by the novel process, it is preferred to soak the beans until they have swollen to about twice the normal size or have absorbed a substantial amount of brine, say about 100 to about 120% by weight. Of course, those skilled in the art will appreciate that the most practical manner to control this step of the process is by visual inspection. The amount of brine absorbed in practice will vary, but it is preferred to remove the beans from the brine when they have absorbed about 120% by weight as indicated by swelling to about twice the original size.

The salt concentration of the brine may be varied in accordance with the use to which the soya beans are to be put. In accordance therewith I have soaked soya beans in water containing no salt and only flavoring and/or coloring matter, in brines containing 4%, 8%, 10% and 20% salt and in brines containing flavoring and/or coloring principles.

My improved soya beans possess distinctive and unique characteristics. Thus, they have an increased or inflated volume making them light and fluffy. In other words, the soya bean is puffed or swollen many times beyond its natural size. Due to this increased size, the improved beans have a very attractive appearance. In addition, my improved processed beans are non-greasy. My improved soya beans provide a foodstuff which is easily digestible and gives a valuable addition to the diet because of the alkalinity of the ash and the calorific value of the bean. The novel soya beans of the present invention have a non-leaking, non-greasy enveloping film or coating around each bean. This film of high melting point solid fat, solid at normal room temperatures and up to about 120° F., does not melt or become greasy at normal room temperatures and up to about 100° F. and even up to about 120° F. In contrast to the prior art products which smear and contaminate all oil absorbent surfaces such as conventional paper and the human skin, the soya beans of my unique product do not contaminate oil absorbent surfaces of this type. Furthermore, the natural oils and flavoring and/or coloring agent employed in my novel process are sealed within the individual beans by this film of fat solid at normal room temperatures and up to about 100° F. to about 120° F. Of course, in my novel process this fat solid at normal room temperatures and up to about 100° F. to about 120° F. which I employ as a frying or dehydrating medium is converted into a hot oil by heating to temperatures of about 390° F. to about 410° F. as those skilled in the art will understand. Furthermore, my improved soya beans have a more appetizing appearance than conventional dense and/or shriveled, greasy soya beans.

Although the present invention has been described in connection with a preferred procedure of carrying the invention into practice, it is to be understood that variations and modifications may be resorted to as those skilled in the art will readily understand. Such variations and modifications are considered to be within the purview and scope of the appended claims. Thus, instead of vanilla, which contains both a flavoring agent and a coloring agent, other flavoring and/or coloring substances can be used, as those skilled in the art will readily understand. Thus pistachio may be used or any other oil soluble flavor such as butter flavor.

The present application is a continuation-in-part of my prior application Serial No. 82,255, filed May 28, 1936.

I claim:

1. The method of processing soya beans which comprises soaking soya beans in water containing sodium chloride and flavoring-coloring agent, and frying the beans in hot oil until the residual moisture of the beans is about 2% or 3%.

2. The method of processing soya beans which comprises soaking soya beans in a soaking medium comprising an aqueous solution containing sodium chloride and flavoring and coloring agent until the beans have swollen to about twice the original volume and the beans have absorbed a substantial amount of said soaking medium, draining said beans, immersing said beans in hot oil, raising the temperature of said oil until but 2% or 3% of the moisture of the beans remains, drying said dehydrated beans, and removing the skins therefrom.

3. The method of processing soya beans which includes soaking the beans in brine until said beans have absorbed a substantial amount of brine, draining said beans, immersing said beans in hot oil, raising the temperature of said oil until but 2% or 3% of the moisture of the beans remains, drying said dehydrated beans, and removing the skins therefrom.

4. The method of processing soya beans which includes soaking the beans in brine until said beans have absorbed brine in an amount substantially 120% by weight, draining said beans, immersing said beans in hot oil, raising the temperature of said oil until but 2% or 3% of the moisture of the beans remains, drying said dehydrated beans, and removing the skins therefrom.

5. The method of processing soya beans which includes soaking the beans in brine and coloring matter until said beans have absorbed a substantial amount of brine and coloring matter, draining said beans, immersing said beans in hot oil, raising the temperature of said oil until but 2% or 3% of the moisture of the beans remains, drying said dehydrated beans and removing the skins therefrom.

6. The method of processing soya beans which includes soaking the beans in a soaking medium until the beans have absorbed a substantial amount of said soaking medium, draining said beans, immersing said drained beans in a hot oleaginous dehydrating medium, raising the temperature of said dehydrating medium until the beans have but 2% or 3% residual moisture, and draining said beans.

7. The method of processing soya beans which includes soaking the beans in brine until the beans have a density of about 1.1 to about 1.18, draining said beans, immersing said drained beans in a hot oleaginous dehydrating medium, raising the temperature of said dehydrating medium until the beans have acquired a yellow to light brown color, and removing excess dehydrating medium from said beans.

8. In the process of preparing soya beans which includes soaking the beans until they have absorbed a substantial amount of the soaking medium, dehydrating said beans until but 2% or 3% of the moisture remains and removing excess dehydrating agent, the improvement which comprises dehydrating the beans by immersing said beans in an oleaginous dehydrating medium selected from the group of fats solid at normal room temperatures and up to about 120° F. consisting of hydrogenated cocoanut oil, hydrogenated cottonseed oil and cocoa butter.

9. In the process of treating soya beans which includes soaking the beans in a soaking medium until they have a density of about 1.07 to about 1.18, draining said beans, immersing said beans in a hot oleaginous dehydrating medium and removing excess dehydrating medium from said beans, the improvement which comprises employing a fat solid at normal room temperatures and up to about 120° F. as the dehydrating medium.

10. The method of processing soya beans which includes soaking the beans in brine until said beans have absorbed brine in an amount substantially 120% by weight, draining said beans, immersing said beans in hot oil, raising the temperature of said oil until but 2% or 3% of the moisture of the beans remains, drying said dehydrated beans and removing the skins therefrom.

11. The method of processing soya beans which includes soaking the beans in brine until said beans have absorbed a substantial amount of brine, draining said beans, immersing said beans in hot oil, raising the temperature of said oil until but 2% or 3% of the moisture of the beans remains, drying said dehydrated beans and removing the skins therefrom.

12. The method of processing soya beans which includes soaking the beans in brine until said beans have absorbed brine in an amount substantially 120% by weight, said brine containing coloring and flavoring for absorption by said beans, draining said beans, immersing said beans in hot oil having a temperature before said immersion of substantially 410° F., raising the temperature of said hot oil until but 2% or 3% of the moisture of the beans remains, drying said dehydrated beans and removing the skins therefrom.

13. The method of processing soya beans which includes soaking the beans in brine until said beans have absorbed brine in an amount substantially 120% by weight, said brine containing coloring and flavoring for absorption by said beans, draining said beans, immersing said beans in hot oil, raising the temperature of said oil until but 2% or 3% of the moisture of the beans remains, drying said dehydrated beans and removing the skins therefrom.

14. The method of processing soya beans which includes soaking the beans in brine and coloring until said beans have absorbed a substantial amount of brine and coloring, draining said beans, immersing said beans in hot oil, raising the temperature of said oil until but 2% or 3% of the moisture of the beans remains, drying said dehydrated beans and removing the skins therefrom.

15. The method of processing soya beans which includes soaking the beans in brine and flavoring until said beans have absorbed a substantial amount of brine and flavoring, draining said beans, immersing said beans in hot oil, raising the temperature of said oil until but 2% or 3% of the moisture of the beans remains, drying said dehydrated beans and removing the skins therefrom.

16. The method of processing soya beans which includes soaking the beans in brine having flavoring and coloring therein, and frying the beans in hot oil until but 2% or 3% of moisture remains in the beans.

17. The method of processing soya beans which includes soaking the beans in brine having flavoring and coloring therein, and frying the beans in hot oil until the beans have acquired a light brown color.

ORESTE SCALISE.